United States Patent [19]

Martinie

[11] Patent Number: 5,489,156
[45] Date of Patent: Feb. 6, 1996

[54] BEARING ASSEMBLY UTILIZING IMPROVED CLAMPING ARRANGEMENT

[75] Inventor: Howard M. Martinie, Simpsonville, S.C.

[73] Assignee: Reliance Electric Industrial Co., Greenville, S.C.

[21] Appl. No.: 359,038

[22] Filed: Dec. 19, 1994

[51] Int. Cl.⁶ ..................................................... F16C 27/04
[52] U.S. Cl. .......................... 384/538; 384/585; 403/370
[58] Field of Search .................................. 384/538, 540, 384/581, 584, 585; 403/370

[56] References Cited

U.S. PATENT DOCUMENTS

| | | | |
|---|---|---|---|
| 738,445 | 9/1903 | Hoffmann | 384/540 |
| 1,526,008 | 2/1925 | Olson | 384/540 |
| 1,843,463 | 2/1932 | Tawresey . | |
| 2,043,272 | 6/1936 | Wallgren . | |
| 2,650,867 | 9/1953 | Spieth | 384/540 |
| 3,033,597 | 5/1962 | Miller . | |
| 3,497,274 | 2/1970 | Yardley . | |
| 3,807,820 | 4/1974 | Schuhmann | 384/538 |
| 3,953,142 | 4/1976 | Price et al. | 403/371 |
| 4,364,687 | 12/1982 | Adell | 403/370 |
| 5,009,539 | 4/1991 | Muellenberg | 403/370 |
| 5,011,306 | 4/1991 | Martinie | 384/585 |
| 5,067,847 | 11/1991 | Muellenberg | 403/370 |

FOREIGN PATENT DOCUMENTS

| | | |
|---|---|---|
| 0235366A2 | 9/1987 | European Pat. Off. . |
| 2120360 | 11/1983 | United Kingdom . |

*Primary Examiner*—Thomas R. Hannon
*Attorney, Agent, or Firm*—Dority & Manning

[57] ABSTRACT

A bearing assembly includes an improved clamping arrangement for securement to a shaft. The inner ring of the bearing assembly includes a tapered inner surface generally complementary to a tapered outer surface of a tapered adapter. Each of the tapered adapter and the inner ring member include an axial extension portion which are situated to be proximate one another during use. A nut is provided interconnecting the extension portions such that relative axial movement may be effected between the inner ring member and the tapered adapter. As a result, the bearing assembly may be secured to or removed from the shaft.

34 Claims, 7 Drawing Sheets

BEARING ASSEMBLY UTILIZING IMPROVED CLAMPING ARRANGEMENT

BACKGROUND OF THE INVENTION

The present invention relates generally to means for clamping a bearing assembly to an elongated shaft. More particularly, the invention relates to a bearing assembly incorporating an improved arrangement to effect securement thereof to a shaft.

Bearing assemblies are often designed to be quickly attached to a shaft. Typically, the bearing assembly is first slipped along the shaft to the desired position. Once there, the inner ring of the bearing assembly is secured to the shaft utilizing one of various clamping techniques.

A common clamping technique involves the use of a tapered adapter having a tapered outer surface. Such an adapter defines an axial bore for receipt of a shaft therethrough and further defines a radial slot extending along its length. A bearing assembly having a receiving bore with a tapered inner surface is situated about the tapered adapter. The bearing assembly and the tapered adapter are forced axially into one another. As a result, the tapered adapter is closed around the shaft. Further movement of the bearing assembly along the tapered outer surface achieves a press fit between the various components.

Generally, bearing assemblies utilizing tapered adapters have been commercially available in two general types, a pull type and a push type. In the pull type, threads are defined on the tapered adapter adjacent its lesser diameter end. A lock nut is tightened onto the threads to "pull" the tapered adapter into the shaft bore of the bearing assembly. One exemplary pull-type adapter is illustrated in U.S. Pat. No. 5,011,306, issued Apr. 30, 1991 to Martinie and incorporated herein by reference.

A limitation of this design is the large cross section required to accommodate threads situated at the lesser diameter end of the tapered adapter. In addition, this design has often been difficult to disassemble. Specifically, a lack of a convenient means to remove the bearing from the adapter has frequently resulted in destruction of the bearing during removal. This has resulted in lost equipment service due to the long removal time, as well as costs associated with any destruction of the bearing.

The push type adapter also has limitations in practical service. Specifically, this design has often required a special shoulder against which the bearing is abutted on one side. Further, threads are typically defined about the shaft for receiving a nut abutting the tapered adapter on the other side. As the nut is tightened, the tapered adapter is "pushed" into the shaft bore of the bearing assembly. Another nut must generally be provided to remove the adapter from the bearing assembly and shaft. It will be appreciated that the special features of the shaft in this design contribute to considerable expense in manufacture and service.

SUMMARY OF THE INVENTION

The present invention recognizes and addresses the foregoing disadvantages, and others, of prior art constructions and methods. Accordingly, it is an object of the present invention to provide a bearing assembly having an improved clamping arrangement.

It is another object of the present invention to provide an improved bearing clamping assembly for securing a bearing to an elongated shaft.

It is a more particular object of the present invention to provide an improved clamping arrangement which facilitates securement and removal from the same axial side thereof.

Some of these objects and achieved by a bearing assembly for receipt of a shaft therein. Such a bearing assembly comprises a tapered adapter defining a first axial bore for receipt of the shaft therethrough, the tapered adapter having a radial slot extending along the length thereof. The tapered adapter further defines a tapered outer surface extending between a first end of lesser diameter and a second end of greater diameter than the first end.

The bearing assembly also includes a bearing inner ring member defining an inner race way about an outer surface thereof. The bearing inner ring member further defines a second axial bore having a tapered inner surface extending between a third end of greater diameter and a fourth end of lesser diameter than the third end. The tapered adapter is received in the second axial bore of the bearing inner ring member.

A bearing outer ring member defines an outer race way about an inner surface thereof. The outer ring member is situated such that the outer race way is radially outward of the inner race way defined by the inner ring member. A plurality of bearing elements are disposed between the inner race way and the outer race way to permit relative rotation between the inner ring member and the outer ring member.

The tapered adapter further includes a first extension portion axially extending from one of the first end and the second end. Similarly, the inner ring member includes a second extension portion axially extending from one of the third end and the fourth end such that the second extension portion will be proximate to the first extension portion during use.

A nut is provided having a first axial portion for receipt around the first extension portion and a second axial portion for receipt around the second extension portion. The nut functions to interconnect the tapered adapter and the inner ring member to effect relative axial movement therebetween. As a result, the bearing assembly may be selectively secured or removed from the shaft.

In some exemplary constructions, the first extension portion axially extends from the second end of the tapered adapter and the second extension portion axially extends from the third end of the inner ring member. In such embodiments, the first extension portion may define outer threads which operatively engage inner threads defined by the first axial portion of the nut. Respective circumferential grooves may be defined by the inner ring member and the second axial portion of the nut which are situated during use in radial opposition to one another. An annular space is thus defined between the circumferential grooves into which at least one arcuate member is disposed.

In embodiments utilizing opposed circumferential grooves, the nut may comprise a unitary nut having both of the first axial portion and the second axial portion. Preferably, the second circumferential groove will be defined in such embodiments having sufficient depth to receive the arcuate member during alignment of the respective grooves. The nut may further include at least one radial screw for maintaining the arcuate members partially in both of the circumferential grooves during use. The second circumferential groove may be made more shallow if the nut is configured as two annular nut elements connected together and interfacing at the second circumferential groove.

In some exemplary constructions, the arcuate members collectively comprise a pair of substantially semi-circular members. Each of the substantially semi-circular members preferably has a reduced width at respective opposite ends to facilitate clearance during alignment of the circumferential grooves. Such arcuate members may have notches defined in their outer arcuate surface to receive a portion of an associated radial screw. In other exemplary constructions, three or more arcuate members may be provided. A shroud member may circumferentially surround the arcuate members in such embodiments.

Other exemplary constructions are provided having a circumferential lip extending about at least a portion of an inner surface of the second axial portion of the nut. This lip engages the circumferential groove in the second extension portion or a flange extending about the second extension portion. In such embodiments, the nut may include a plurality of nut segments adapted to be secured together into a rigid member. Each of the nut segments defines an arcuate shaft receiving portion arranged so that when the nut is secured together the nut segments define a circular interior for receiving the first extension portion and the second extension portion.

In some exemplary constructions, the second extension portion of the tapered adapter may define outer threads operatively engaging inner threads defined by the second axial portion of the nut. In such embodiments, the first extension portion of the tapered adapter may include a circumferential flange and the second axial portion of the nut may include a circumferential groove for receiving the flange. Preferably, an inner side wall of the circumferential groove is defined by a flange having an inner diameter greater than an outer diameter of the circumferential lip upon closure of the radial slot in the tapered adapter.

Other objects of the invention are achieved by a method of securing a bearing assembly to a shaft. The method comprises the step of providing suitable apparatus comprising a suitable tapered adapter, bearing assembly and nut. The tapered adapter has outer threads at an extension portion situated proximate the larger diameter end thereof for engaging inner threads defined in the nut. A second extension portion axially extending from the bearing inner ring member defines a first circumferential groove which may be axially aligned with a second circumferential groove defined in the nut. At least one arcuate member is further provided of a size to be received in the circumferential grooves.

A further step of the method involves placing the bearing assembly on the tapered adapter such that the respective tapered surfaces thereof are generally complementary. As an additional step, the arcuate members are placed into the second circumferential groove. A further step involves threading the nut onto the tapered adapter until the circumferential grooves are in radial alignment. Additionally, a portion of the arcuate members are moved out of the second circumferential groove and into the first circumferential groove such that the nut and the bearing assembly will be connected. After the arcuate members are in position and the nut is placed about the extension portions, the nut is further rotated to effect relative axial movement between the bearing assembly and the tapered adapter. Preferably, the arcuate members are moved into the first circumferential groove by tightening radial screws provided in the nut.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the discussion herein is a description of exemplary embodiments only, and is not intended as limiting the broader aspects of the present invention, which broader aspects are embodied in the exemplary constructions.

Figure 1:
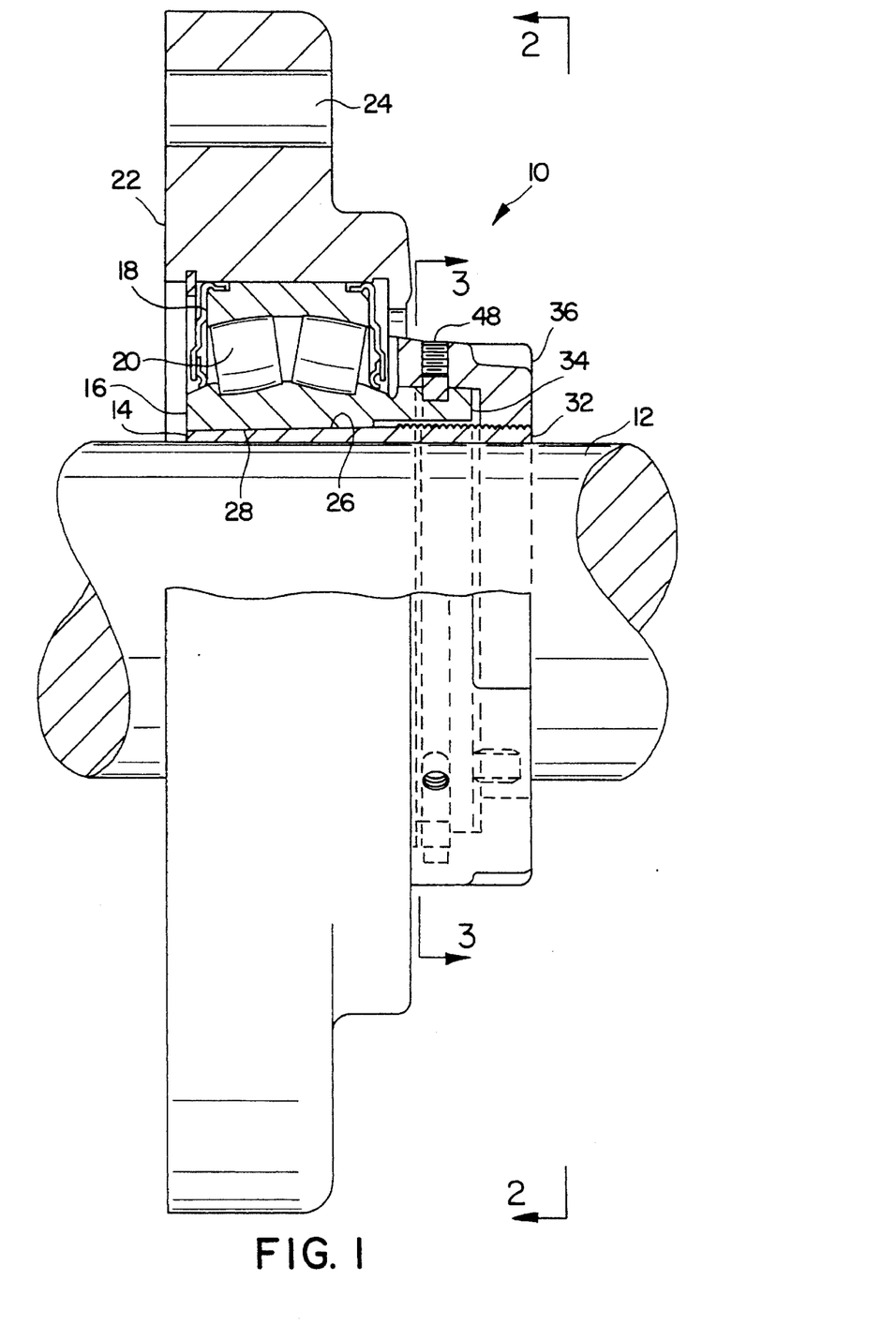
FIG. 1 is a partial cross-sectional view of one embodiment of a bearing assembly constructed in accordance with the present invention.
Figure 2:
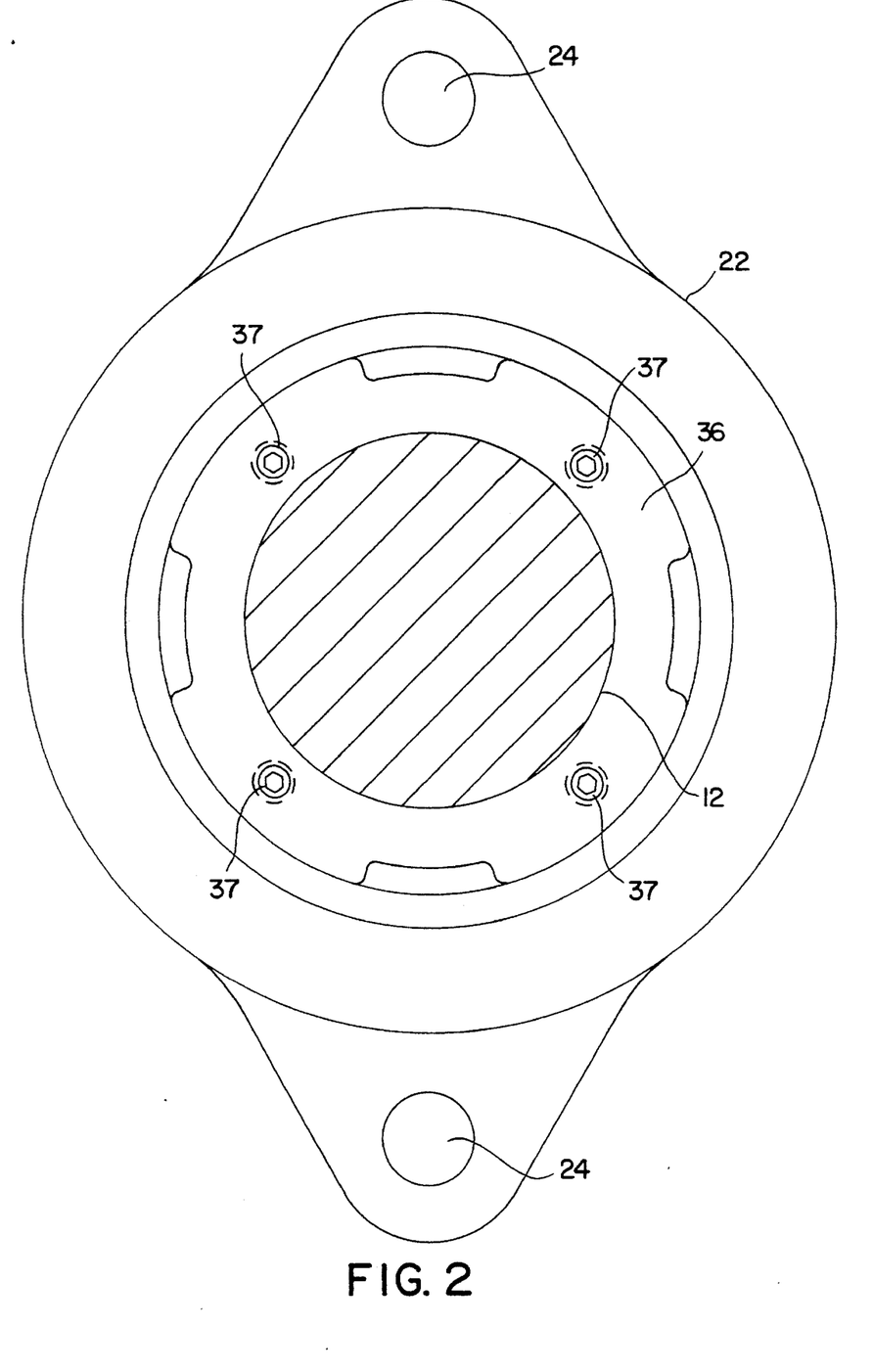
FIG. 2 is a front elevational view of the bearing assembly of FIG. 1 as taken along lines 2—2.
Figure 3:
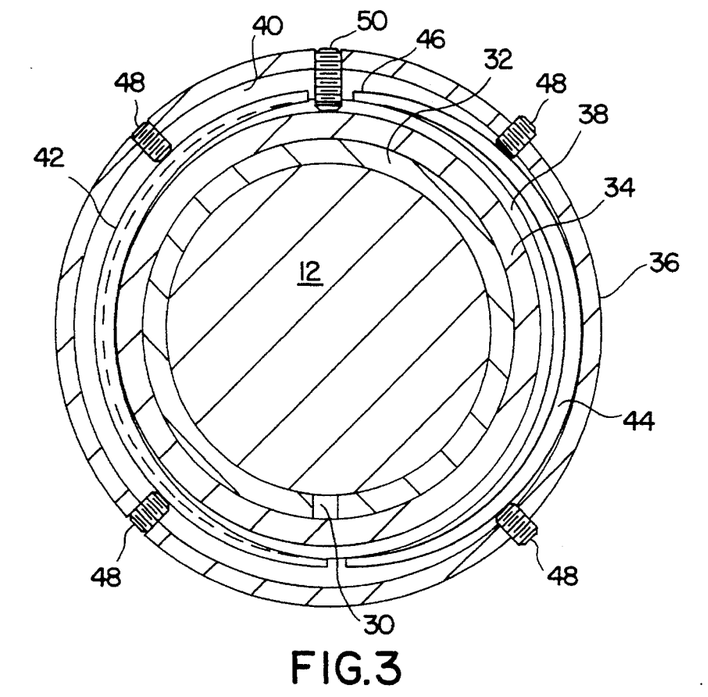
FIG. 3 is a cross-sectional view of the bearing assembly of FIG. 1 as taken along lines 3—3.

Referring now to FIGS. 1 through 3, a bearing assembly (generally indicated at 10) constructed in accordance with the present invention is shown secured to a shaft 12. Bearing assembly 10 includes a tapered adapter 14 through which shaft 12 extends. A bearing inner ring member 16 is received about tapered adapter 14, as shown. Inner ring member 16 defines an inner race way about its outer circumferential surface. An outer ring member 18 is provided having an outer race way situated in opposition to the inner race way defined on inner ring member 16. A plurality of bearing elements, such as roller bearings 20, are disposed between the inner race way and the outer race way to facilitate relative rotation between ring members 16 and 18. While roller bearings are illustrated, it should be appreciated that other suitable types of bearing elements, such as ball bearings, may also be utilized.

It can be seen that bearing assembly 10 further includes a housing 22. Housing 22 is configured as a flange housing such that bearing assembly 10 may be mounted to a suitable wall or plate through which shaft 12 extends. In the illustrated construction, such a wall would be juxtaposed to the left side of bearing assembly 10 in the orientation of FIG. 1.

Housing 22 may be maintained to the wall by bolts (not shown) inserted through bores 24 defined in housing 22.

Tapered adapter 14 includes a first end of a lesser diameter extending to a second end of greater diameter. A tapered outer surface 24 is thus defined between these ends of adapter 14. As shown, inner ring member 16 defines a tapered inner surface 28 generally complementary to tapered outer surface 26. Adapter 14 further defines a radial opening, or slot, 30 extending along its entire axial length, as can be most easily seen in FIG. 3. Radial opening 30 allows adapter 14 to contract as tapered outer surface 26 and tapered inner surface 28 are moved axially together. As a result, positive clamping of bearing assembly 10 with respect to shaft 12 is achieved.

Tapered adapter 14 further includes an extension portion 32 axially extending from the larger diameter end of tapered outer surface 26. Similarly, inner ring member 16 also includes an extension portion 34 axially extending from the larger diameter end of tapered inner surface 28. A nut 36 includes a first axial portion having inner threads for engaging outer threads defined about extension portion 32. As will be described more fully below, nut 36 is also suitably connected to inner ring member 16 via extension portion 34 such that axial movement of nut 36 will cause corresponding axial movement of inner ring member 16. Preferably, however, the connection of nut 36 to extension portion 34 will allow free rotation of nut 36 with respect thereto. Thus, tightening of nut 36 will cause tapered outer surface 26 and tapered inner surface 28 to be moved into engagement. Rotation of nut 36 in the opposite direction will cause tapered outer surface 26 and tapered inner surface 28 to be moved out of engagement. A plurality of axial set screws 37 are also provided threadingly received in holes extending through nut 36 screws 37 engage inner ring member 16 to facilitate removal thereof out of engagement with tapered adapter 14 in a similar manner to that described in copending U.S. patent application Ser. No. 07/957,666 filed Oct. 7, 1992 by the present inventor and incorporated herein by reference now U.S. Pat. No. 5,373,636.

Referring now particularly to FIG. 3, a preferred manner by which nut 36 may be suitably connected to inner ring member 16 is illustrated. In this embodiment, a circumferential groove 38 is defined about the outer surface of extension portion 32. Similarly, another circumferential groove 40 is defined about the inner surface of the second axial portion of nut 36. In use, grooves 38 and 40 are radially opposed to define therein an annular space. Appropriate arcuate members are disposed in this annular space to connect nut 36 with inner ring member 16 in the manner described. In the illustrated embodiment, such arcuate members comprise a pair of substantially semicircular arcuate members 42 and 44.

To permit nut 36 to be received over extension portion 34 during alignment of grooves 38 and 40, groove 40 is of a sufficient depth to permit members 42 and 44 to be received entirely therein. As can be seen, members 42 and 44 taper to a reduced width at their respective end portions, such as end portion 46 of member 44. The reduced width of these end portions permits the depth of groove 40 to be more shallow than would be the case if the width of members 42 and 44 remained constant.

Nut 36 is further equipped with a plurality of radial set screws 48 extending into groove 40. Retraction of set screws 48 permits arcuate members 42 and 44 to be received in groove 40 for alignment of grooves 38 and 40 as described above. After grooves 38 and 40 are in alignment, set screws 48 may be tightened to push arcuate members 42 and 44 partially into groove 38. For purposes of illustration, arcuate member 42 is shown in position for use whereas member 44 is out of position for groove alignment. A further set screw 50 may be provided to prevent arcuate members 42 and 44 from shifting position during operation of bearing assembly 10.

Figure 3A:
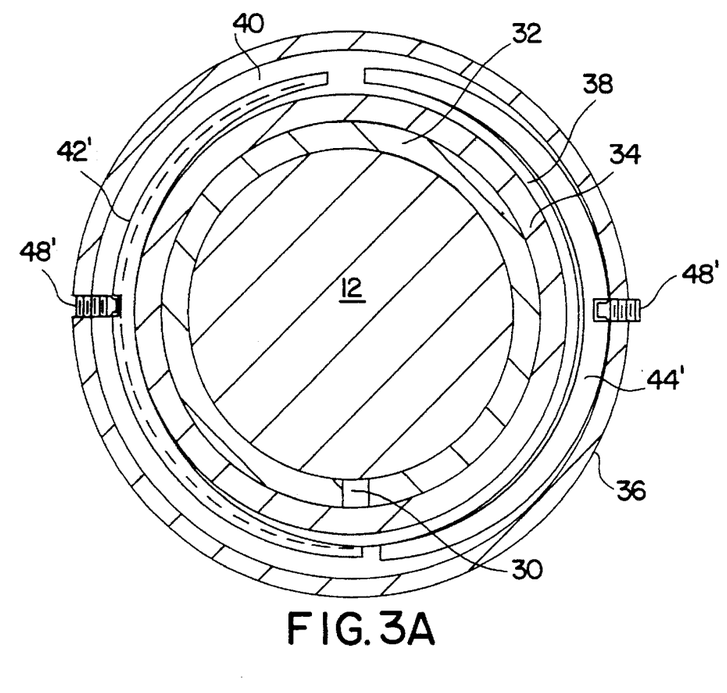
FIG. 3A is a view similar to FIG. 3 illustrating a modification of the substantially semicircular arcuate members thereof.

FIG. 3A illustrates a modification of the embodiment of FIG. 3 which is simplified in some respects. In this case, arcuate members 42' and 44' each define a radial notch in their outer arcuate surface. As shown, the radial notches receive a portion of radial screws 48'. It will be appreciated that these radial notches prevent members 42' and 44' from shifting position during use. Thus, an additional set screw such as screw 50 may not be necessary.

Figure 3B:
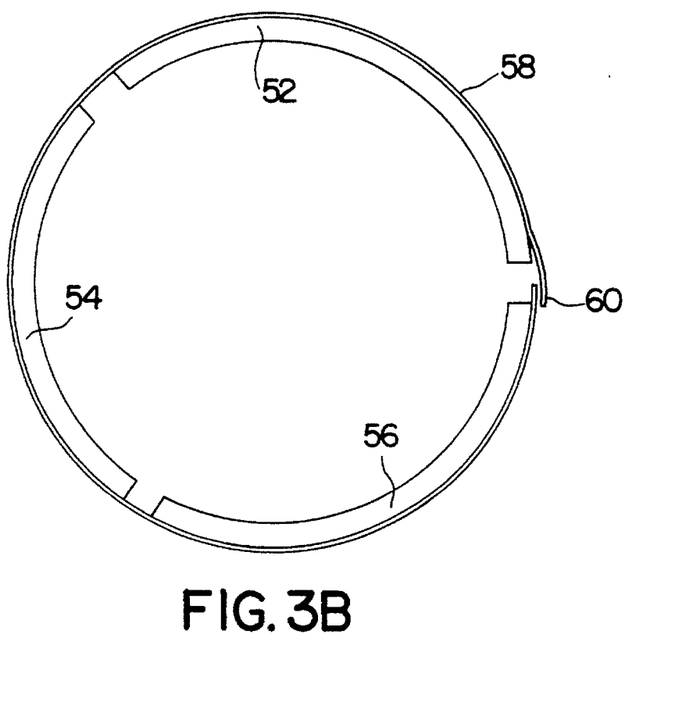
FIG. 3B is an elevational view diagrammatically illustrating alternative arcuate members for interconnecting the bearing inner ring member and the nut.

FIG. 3B illustrates an alternative configuration for the arcuate members. In this case, three arcuate members 52, 54 and 56 are provided. When members 52, 54 and 56 are out of position, a space will be defined between adjacent ends thereof, as shown. This space will preferably be completely closed when members 52, 54 and 56 are in position, resulting in a substantially continuous ring. A band, or "shroud," 58 may be provided to circumferentially surround members 52, 54 and 56. As shown, shroud 58 is split, partially overlapping as indicated at 60. Thus, as members 52, 54 and 56 are moved into position, the diameter of shroud 58 may appropriately contract.

Figure 4:
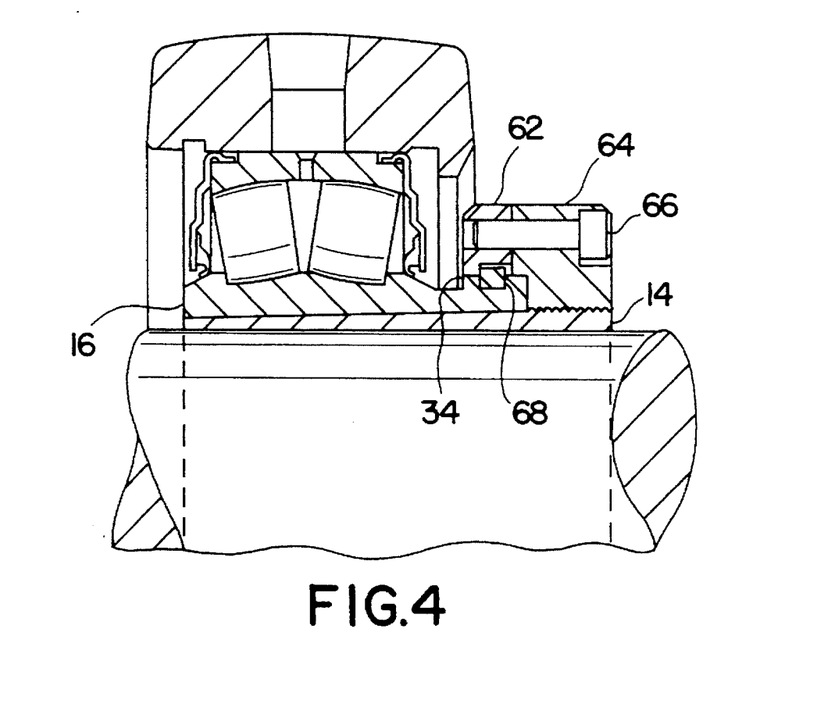
FIG. 4 is a partial cross-sectional view of another embodiment of a bearing assembly constructed in accordance with the present invention.

FIG. 4 illustrates another embodiment similar in many respects to the embodiment of FIGS. 1 through 3. Unlike the embodiment of FIGS. 1 through 3, however, the nut is constructed in this case of two annular nut segments 62 and 64. Segments 52 and 54 are connected together by bolts, such as bolt 66, or other suitable means. As shown, an inner circumferential groove is defined by the interface of segments 62 and 64. In this construction, the arcuate members, such as arcuate member 68, are simply placed in the groove of extension portion 34 before elements 62 and 64 are mated. When elements 62 and 64 are mated, the arcuate members will be captured in the annular space defined by the opposed grooves.

Figure 5:
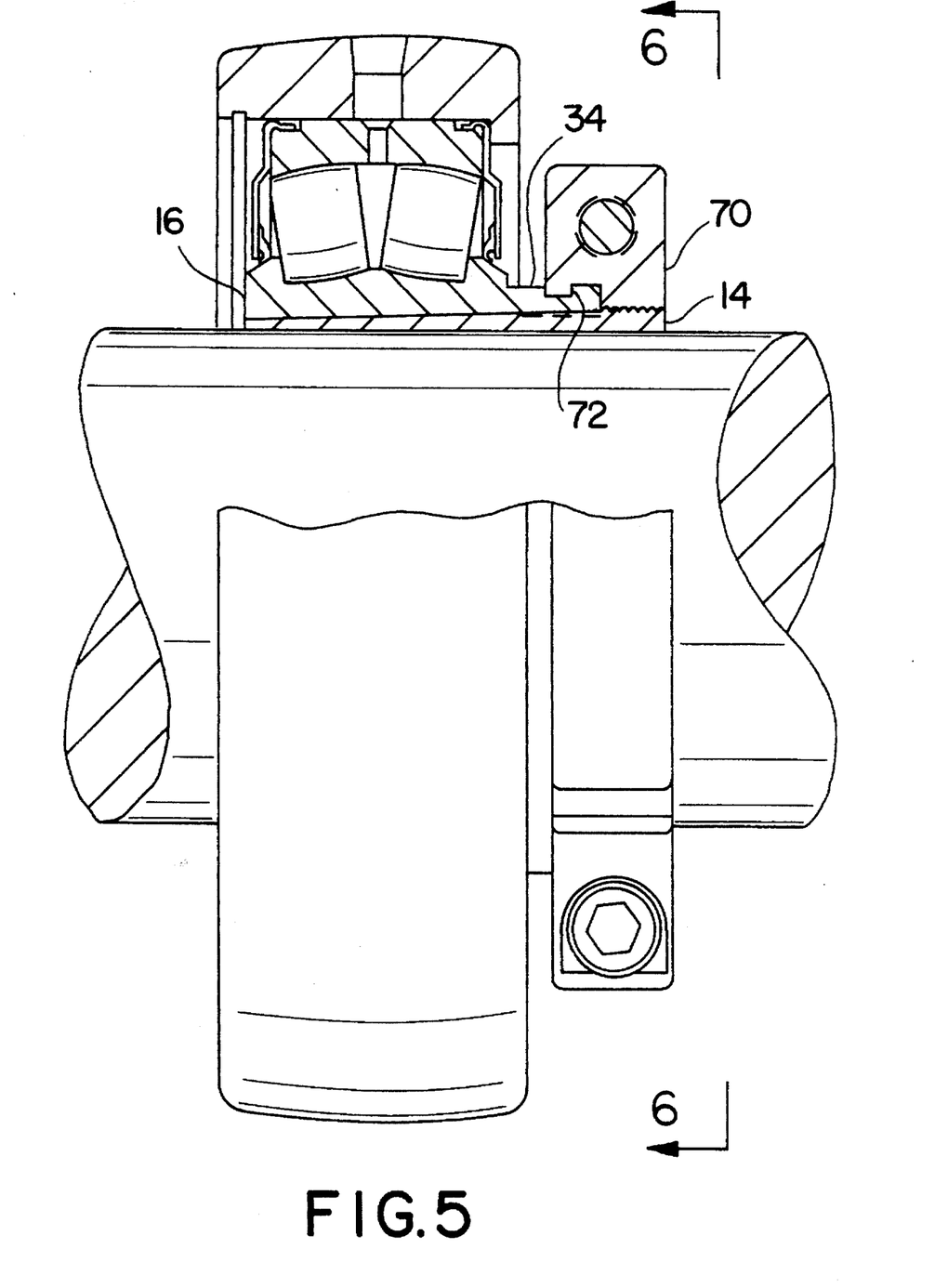
FIG. 5 is a partial cross-sectional view of a still further embodiment of a bearing assembly constructed in accordance with the present invention.
Figure 6:
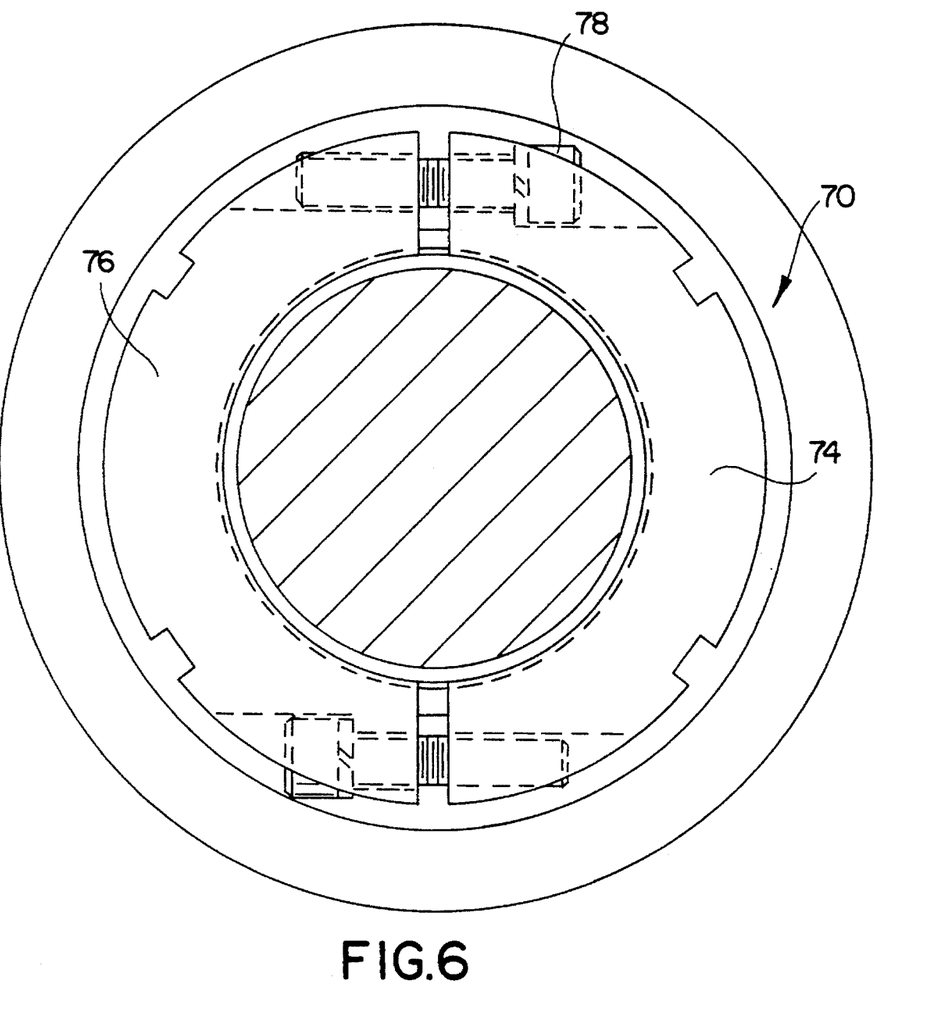
FIG. 6 is a front elevational view of the bearing assembly of FIG. 5 as taken along lines 6—6.

FIGS. 5 and 6 illustrate a further embodiment which does not require the use of arcuate members as described above. Instead, nut 70 defines a circumferential lip 72 extending about its inner surface. Lip 72 engages the groove defined in extension portion 34 of inner ring member 16. Thus, rotation of nut 70 will cause relative axial movement between adapter 14 and inner ring member 16 as described above.

As can be most clearly seen in FIG. 6, nut 70 is constructed of a pair semicircular nut segments 74 and 76. Segments 74 and 76 each define an arcuate shaft receiving portion as shown. Bolts, such as bolts 78, are provided so that segments 74 and 76 may be secured into a rigid member. As a result, a circular interior is defined for receiving extension portions 32 and 34.

Figure 7:
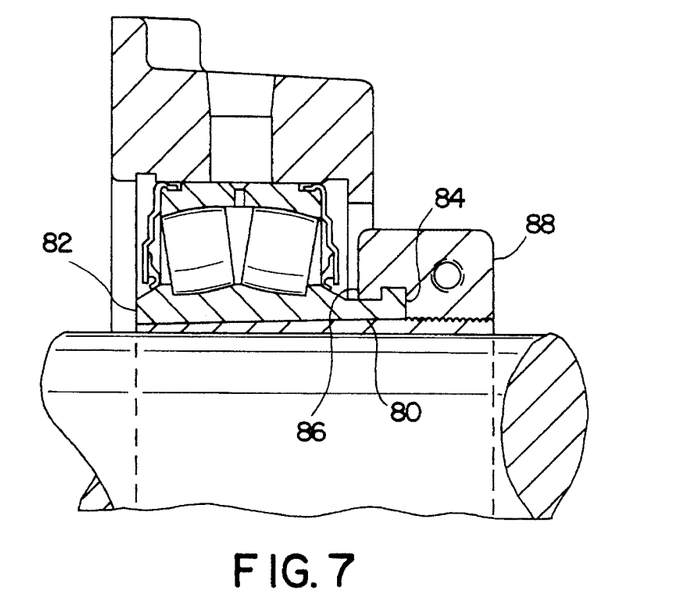
FIG. 7 is a partial cross-sectional view of a still further embodiment of a bearing assembly constructed in accordance with the present invention.

A further embodiment similar in many respects to the embodiment of FIGS. 5 and 6 is also illustrated in FIG. 7. In this case, however, an extension portion 80 of inner ring member 82 defines a flange 84 for engaging a lip 86 of nut 88. Again, nut 88 comprises a plurality of nut segments secured together into a rigid member.

Figure 8:
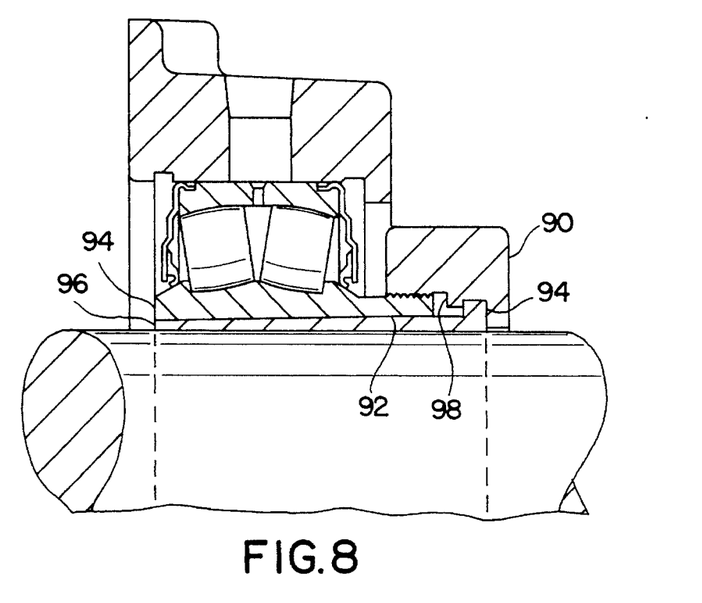
FIG. 8 is a partial cross-sectional view of a still further embodiment of a bearing assembly constructed in accordance with the present invention.

FIG. 8 illustrates an additional embodiment utilizing a unitary nut 90. Unlike the embodiments illustrated above, inner threads on nut 90 engage outer threads defined about extension portion 92 of inner ring member 94. Further, a flange 94 is located on the larger diameter end of tapered adapter 96. It can be seen that flange 94 is received in a groove defined in nut 90. On one side, this groove is defined by a flange 98. The diameter of flange 98 is chosen so that it will remain less than the outer diameter of flange 94 when situated on shaft 12. However, the diameter of flange 98 is configured to be greater than the diameter of flange 94 when the radial slot of tapered adapter 96 is closed. Thus, tapered adapter 96 may be contracted prior to being fitted on shaft 12 in order to connect tapered adapter 96 and nut 90.

While preferred embodiments of the invention have been shown and described, modifications and variations thereto may be practiced by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A bearing assembly for receipt of a shaft therein, said bearing assembly comprising:
    a tapered adapter defining a first axial bore for receipt of the shaft therethrough and having a radial slot extending along the length thereof, said tapered adapter further defining a tapered outer surface and including a first extension portion axially extending from a greater diameter end of said tapered outer surface;
    a bearing inner ring member defining an inner raceway about an outer surface thereof and further defining a second axial bore having a tapered inner surface for receipt of said tapered adapter therein, said bearing inner ring member including a second extension portion axially extending from a greater diameter portion of said tapered inner surface;
    a bearing outer race member defining an outer raceway about an inner surface thereof, said bearing outer race member situated such that said outer raceway is radially outward of said inner raceway generally in axial alignment therewith;
    a plurality of bearing elements disposed between said bearing inner raceway and said bearing outer raceway; and
    a nut having a first axial portion for receipt around said first extension portion and a second axial portion for receipt around said second extension portion, said nut interconnecting said tapered adapter and said bearing inner ring member to effect relative axial movement therebetween.

2. A bearing assembly as set forth in claim 1, wherein said first extension portion of said tapered adapter defines outer threads and said first axial portion of said nut defines inner threads, said outer threads operatively engaging said inner threads.

3. A bearing assembly as set forth in claim 2, wherein said second extension portion of said bearing inner race member and said second axial portion of said nut define respective circumferential grooves situated during use in radial opposition to define an annular space, and further including at least one arcuate member disposed in said annular space.

4. A bearing assembly as set forth in claim 3, wherein said nut comprises a unitary nut having said first axial portion and said second axial portion.

5. A bearing assembly as set forth in claim 4, wherein said second circumferential groove is defined having sufficient depth to receive said at least one arcuate member during alignment of said first circumferential groove and said second circumferential groove.

6. A bearing assembly as set forth in claim 5, wherein said nut includes at least one radial screw actuatable to maintain said at least one arcuate member partially in both of said first circumferential groove and said second circumferential groove during use.

7. A bearing assembly as set forth in claim 6, wherein each of said at least one arcuate member defines a notch on an outer arcuate surface thereof for receiving a portion of a respective radial screw.

8. A bearing assembly as set forth in claim 3, wherein said nut comprises two annular nut elements connected together and interfacing at said second circumferential groove.

9. A bearing assembly as set forth in claim 1, wherein said second extension portion defines a circumferential groove extending around at least a portion of an outer surface thereof and said second axial portion of said nut defines a circumferential lip extending about at least a portion of an inner surface thereof for engaging said circumferential groove.

10. A bearing assembly as set forth in claim 9, wherein said nut includes a plurality of nut segments adapted to be secured together into a rigid member, each of said plurality of nut segments defining an arcuate shaft receiving portion arranged so that when said nut is secured together said nut segments define a circular interior for receiving said first extension portion and said second extension portion.

11. A bearing assembly as set forth in claim 1, wherein said second extension portion of said tapered adapter defines outer threads and said second axial portion of said nut defines inner threads, said outer threads operatively engaging said inner threads.

12. A bearing assembly as set forth in claim 11, wherein said first extension portion of said tapered adapter includes a circumferential flange and said first axial portion of said nut includes a circumferential groove for receiving said circumferential flange.

13. A bearing assembly as set forth in claim 12, wherein an inner sidewall of said circumferential groove is defined by a flange having an inner diameter greater than an outer diameter of said circumferential flange upon closure of said radial slot in said tapered adapter.

14. A clamping arrangement for securement to an elongated shaft, said clamping arrangement comprising:
    a tapered adapter defining an axial bore for receipt of the shaft therethrough, said tapered adapter further defining a tapered outer surface extending between a first end of lesser diameter and a second end of greater diameter than said first end, said tapered adapter further having a first extension portion axially extending from one of said first end and said second end;
    an annular element defining an axial bore for receipt of said tapered adapter therein, said annular element further defining a tapered inner surface extending between a third end of greater diameter and a fourth end of lesser diameter than said third end, said annular element further having a second extension portion axially extending from one of said third end and said fourth end such that said second extension portion will be proximate to said first extension portion during use;
    one of said first extension portion and said second extension portion defining a first circumferential groove extending about at least a portion of an outer surface thereof, another of said first extension portion and said second extension portion defining threads about an outer surface thereof;

a nut having a first axial portion for receipt around said first extension portion and a second axial portion for receipt around said second extension portion;

one of said first axial portion and said second axial portion having threads defined about an inner surface thereof for engaging said threads defined on a corresponding one of said first extension portion and said second extension portion, another of said first axial portion and said second axial portion defining a second circumferential groove extending about at least a portion of an inner surface thereof radially aligned in use with said first circumferential groove; and at least one member configured for receipt in said first circumferential groove and said second circumferential groove such that rotation of said nut will effect axial movement of said annular member with respect to said tapered adapter.

15. A clamping arrangement as set forth in claim 14, wherein said first extension portion axially extends from said second end of said tapered adapter and said second extension portion axially extends from said third end of said annular member.

16. A clamping arrangement as set forth in claim 15, wherein said threads are defined on said first extension portion and said first circumferential groove is defined in said second extension portion.

17. A clamping arrangement as set forth in claim 14, wherein said nut comprises a unitary nut having said first axial portion and said second axial portion.

18. A clamping arrangement as set forth in claim 17, wherein said second circumferential groove is defined having sufficient depth to receive said at least one member during alignment of said first circumferential groove and said second circumferential groove.

19. A clamping arrangement as set forth in claim 18, wherein said nut includes at least one radial screw actuatable to maintain said at least one member partially in said first circumferential groove during use.

20. A clamping arrangement as set forth in claim 19, wherein said at least one radial screw comprises a plurality of radial screws circumferentially spaced apart about said nut.

21. A clamping arrangement as set forth in claim 14, wherein said at least one member comprises a pair of substantially semicircular members.

22. A clamping arrangement as set forth in claim 21, wherein each of said substantially semicircular members has a reduced width at respective opposite ends to facilitate clearance during alignment of said first circumferential groove and said second circumferential groove.

23. A clamping arrangement as set forth in claim 21, wherein said nut includes at least one radial screw actuatable to maintain said pair of substantially semicircular members partially in said first circumferential groove during use.

24. A clamping arrangement as set forth in claim 23, wherein each of said pair of substantially semicircular members defines a notch on an outer arcuate surface thereof for receiving a portion of a respective radial screw.

25. A clamping arrangement as set forth in claim 14, wherein said at least one arcuate member comprises a plurality of arcuate members.

26. A clamping arrangement as set forth in claim 25, further comprising a shroud member circumferentially surrounding said plurality of arcuate members.

27. A clamping arrangement as set forth in claim 14, wherein said nut comprises two annular nut elements connected together and interfacing at said second circumferential groove.

28. A clamping arrangement as set forth in claim 14, wherein said nut includes at least one axial screw engaging said second extension portion, said at least one axial screw actuatable to facilitate separation of said tapered adapter and said annular member.

29. A clamping arrangement as set forth in claim 14, wherein said annular member defines a bearing raceway about an outer surface thereof.

30. A clamping arrangement for securement to an elongated shaft, said clamping arrangement comprising:

a tapered adapter defining a first axial bore for receipt of the shaft therethrough, said tapered adapter further defining a tapered outer surface extending between a first end of lesser diameter and a second end of greater diameter than said first end, said tapered adapter further having a first extension portion axially extending from one of said first end and said second end;

a bearing inner ring member defining a bearing raceway about an outer surface thereof, said bearing inner ring member further defining a second axial bore for receipt of said tapered adapter therein, said second axial bore including a tapered inner surface extending between a third end of greater diameter and a fourth end of lesser diameter than said third end;

said bearing inner ring member further having a second extension portion axially extending from one of said third end and said fourth end such that said second extension portion will be proximate to said first extension portion during use, said second extension portion defining a circumferential groove extending about at least a portion of an outer surface thereof;

a nut having a first axial portion for receipt around said first extension portion and a second axial portion for receipt around said second extension portion, said first axial portion having threads defined about an inner surface thereof for engaging said threads defined on said first extension portion, said second axial portion defining a circumferential lip extending about at least a portion of an inner surface thereof for engaging said circumferential groove; and said nut including a plurality of nut segments adapted to be secured together into a rigid member, each of said plurality of segments defining an arcuate shaft receiving portion arranged so that when said nut is secured together said segments define a circular interior for receiving said first extension portion and said second extension portion, whereby rotation of said nut will effect axial movement of said bearing inner ring member with respect to said tapered adapter.

31. A clamping arrangement as set forth in claim 30, wherein said first extension portion axially extends from said second end of said tapered adapter and said second extension portion axially extends from said third end of said bearing inner race member.

32. A clamping arrangement as set forth in claim 30, wherein said nut includes two nut segments.

33. A method of securing a bearing assembly to a shaft, said method comprising the steps of:

(a) providing apparatus comprising:

(1) a tapered adapter defining a first axial bore for receipt of the shaft therethrough and having a radial slot extending along the length thereof, said tapered adapter further defining a tapered outer surface and including a first extension portion axially extending from a greater diameter end of said tapered outer surface, said first extension portion defining outer threads thereabout;

(2) a bearing assembly including an inner race member defining a second axial bore having a tapered inner surface for receipt of said tapered adapter therein, said bearing inner ring member including a second extension portion axially extending from a greater diameter portion of said tapered inner surface, said second extension portion defining a first circumferential groove about at least a portion of an outer surface thereof;

(3) a unitary nut having a first axial portion for receipt about first extension portion and a second axial portion for receipt about said second extension portion, said first axial portion defining interior threads and said second axial portion defining a second circumferential groove about at least a portion of the length thereof; and (4) at least one arcuate member sized to be received in said first and second circumferential grooves;

(b) placing said bearing assembly on said tapered adapter such that said tapered outer surface and said tapered inner surface are generally complementary;

(c) inserting said at least one arcuate member into said second circumferential groove;

(d) threading said nut onto said tapered adapter until said first circumferential groove and said second circumferential groove are in radial alignment;

(e) moving a portion of said at least one arcuate member out of said second circumferential groove and into said first circumferential groove such that said nut and said bearing assembly will be connected; and (f) further rotating said nut to effect relative axial movement between said bearing assembly and said tapered adapter.

34. A method as set forth in claim 33, wherein said portion of said at least one arcuate member is moved out of said second circumferential groove and into said first circumferential groove by tightening radial set screws provided in said nut.

* * * * *

UNITED STATES PATENT AND TRADEMARK OFFICE
CERTIFICATE OF CORRECTION

PATENT NO. : 5,489,156
DATED : February 6, 1996
INVENTOR(S) : Howard M. Martinie It is certified that error appears in the above-indentified patent and that said Letters Patent is hereby corrected as shown below:

In column 7, line 57, delete "race" and insert therein --ring--.

In column 7, line 58, insert --first and second-- after "respective".

In column 9, line 16, delete "member" and insert therein --element--.

In column 10, line 7, delete "member" and insert therein --element--.

In column 10, line 56, delete "race" and insert therein --ring--.

In column 11, line 3, delete "race" and insert therein --ring--.

In column 11, line 18, delete "length" and insert therein --inner surface--.

Signed and Sealed this

Twenty-third Day of July, 1996

Attest:

BRUCE LEHMAN

Attesting Officer

Commissioner of Patents and Trademarks